July 21, 1936.    H. C. LORD    2,047,976

JOINT

Original Filed Nov. 10, 1931

Hugh C. Lord
INVENTOR.

Patented July 21, 1936

2,047,976

UNITED STATES PATENT OFFICE 2,047,976

JOINT

Hugh C. Lord, Erie, Pa.

Application November 10, 1931, Serial No. 574,071
Renewed October 22, 1935

2 Claims. (Cl. 287—85)

The present invention relates to joints utilizing rubber as the element accommodating the joint through its distortion. Such joints have heretofore been made involving an outer and inner member with an intervening wall of rubber. Under some conditions it is desirable to have a comparatively free angular movement of the members relatively to each other, that is to say, a movement of the axis of one into a position at an angle to the axis of the other. This is very often true where there is a rotative movement in a direction approximating the axis of the joint and a swinging movement crosswise of the axis. The present invention is designed to make the joint more readily yieldable at its ends to accommodate such crosswise movement. Features and details of the invention will appear from the specification and claims.

A preferred embodiment of the invention is illustrated in the accompanying drawing as follows:—

Figure 1:
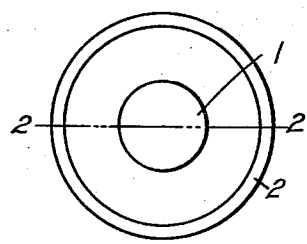

Fig. 1 shows an end view of the joint so formed.

Figure 2:
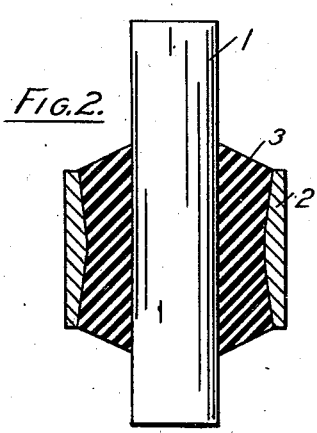

Fig. 2 a section on the line 2—2 in Fig. 1.

Figures 3, 4:
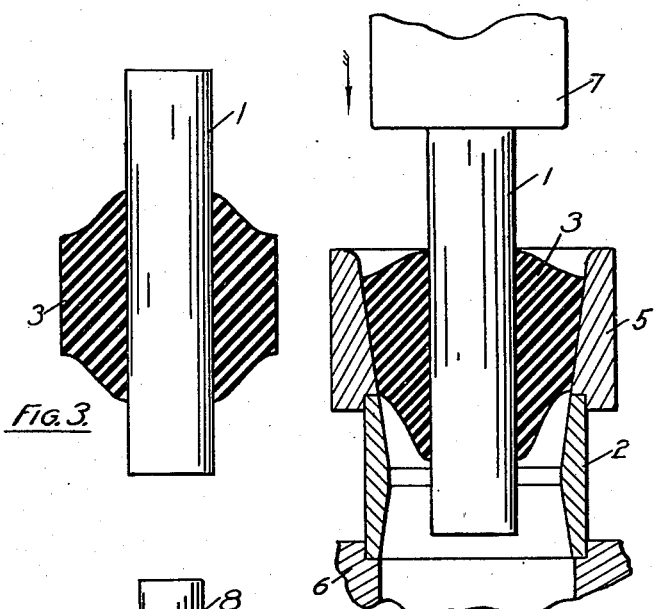

Fig. 3 a view of one form of rubber and central member formed as a preliminary to making the joint shown in Fig. 2.

Fig. 4 a view showing the manner of assembly of the part shown in Fig. 3 into the outer member of Fig. 2.

Figures 5, 7, 8:
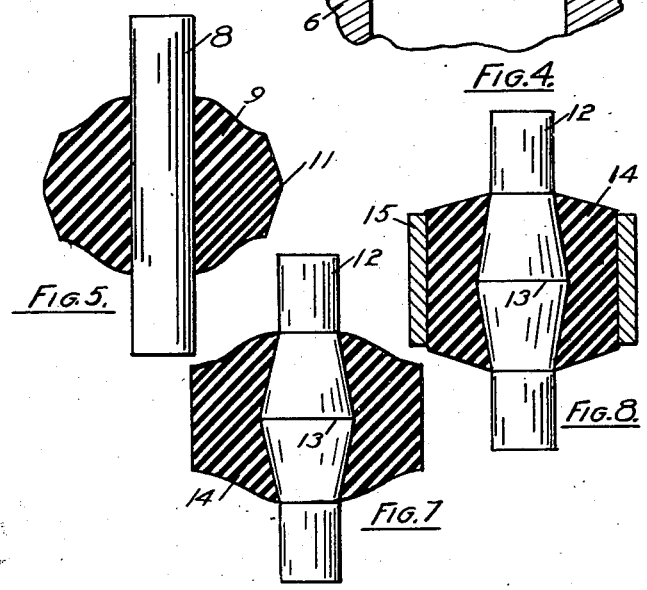

Fig. 5 shows a modified form of central member with the rubber formed thereon.

Figure 6:
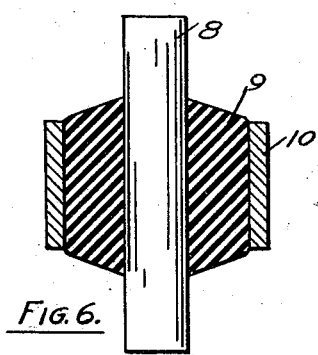

Fig. 6 the completed joint using the central member shown in Fig. 5.

Fig. 7 shows a central member with the rubber formed thereon.

Fig. 8 a completed joint in which the central member shown in Fig. 7 is used.

In the construction shown in Fig. 1, I marks the inner member 2 the outer member, and 3 the wall between the members. It will be noted that the outer member is of hour-glass shape flaring from the center toward the ends and that the initial shape of the rubber when the rubber is in compression is shown in Fig. 3, the outer wall being substantially cylindrical. The rubber 3 is preferably bonded to the central member and is assembled in the outer member in the manner shown in Fig. 4, a funnel 5 being arranged on the outer member, the outer member being placed on a support 6, and the rubber member forced into the outer member by pressure on the inner member through a plunger 7. With this compression joint, it will be noted that the rubber is compressed to a much greater extent at the center axially of the joint than at the ends. In consequence there is a greater freedom of movement at the ends than at the center and the greater wall of rubber facilitates this.

If desired, the outer and inner members may be formed as shown in Fig. 2 and the rubber vulcanized in place. Under these conditions the greater wall of rubber at the ends will give a greater freedom of movement.

In the structure shown in Figs. 5 and 6, the inner member 8 is a cylindrical pin. A wall of rubber 9 is arranged within a cylindrical shell 10. In forming the rubber initially it has a very much greater diameter at the central portion 11 than at the end and in consequence in the final form in the joint the rubber is forced into the shell and has greater compression at the center than at the ends and consequently it is less resistant at the ends than at the center.

The same result is accomplished to an extent in the modification shown in Figs. 7 and 8 where the flaring of the wall of rubber is accomplished by making a pin 12 larger at the center, at 13, a wall of rubber 14 being confined between this central member and a cylindrical shell 15. The rubber here may be formed initially cylindrical, or slightly tapered toward the ends, as shown in Fig. 5, giving to the ends an initial softness as compared with the center, as desired.

In any case the shaping of the rubber relatively to the shell and the shape of the shell relatively to the center pin should be formed to provide a less resistance in the manner indicated in the several modifications toward the end so that the joint will wobble, or permit of freer angular movement than with the rubber of uniform density throughout, or of greater density toward the ends.

What I claim as new is:—

1. In a joint, an outer member; an inner member within the outer member; and a rubber wall under compression between the members bonded to the inner member and the compression being greater in intermediate potions than at the ends.

2. In a joint, an outer member; an inner member within the outer member; and a rubber wall under compression between the members bonded to the inner member throughout the length of the joint and the compression being greater in intermediate portions than at the ends.

HUGH C. LORD.